(12) United States Patent
Aoyagi et al.

(10) Patent No.: US 12,498,611 B2
(45) Date of Patent: Dec. 16, 2025

(54) OPTICAL DEVICE AND METHOD OF MOUNTING ELECTRONIC PART

(71) Applicant: TDK CORPORATION, Tokyo (JP)

(72) Inventors: Takashi Aoyagi, Tokyo (JP); Makoto Fukuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 438 days.

(21) Appl. No.: 18/080,129

(22) Filed: Dec. 13, 2022

(65) Prior Publication Data

US 2023/0258998 A1    Aug. 17, 2023

(30) Foreign Application Priority Data

Feb. 16, 2022 (JP) ................... 2022-022061

(51) Int. Cl.
*G02F 1/16753* (2019.01)
*F21V 8/00* (2006.01)
*G02B 6/42* (2006.01)

(52) U.S. Cl.
CPC ........ *G02F 1/16753* (2019.01); *G02B 6/0011* (2013.01); *G02B 6/4245* (2013.01); *G02B 6/4257* (2013.01); *G02B 6/4274* (2013.01)

(58) Field of Classification Search
CPC . G02F 1/16753; G02B 6/0011; G02B 6/4245; G02B 6/4257; G02B 6/4274
See application file for complete search history.

(56) References Cited

U.S. PATENT DOCUMENTS

2018/0301443 A1* 10/2018 Kim ................... H01L 21/568
2021/0375702 A1* 12/2021 Xiao ................... H10K 59/131

FOREIGN PATENT DOCUMENTS

| CN | 1783445 A | 6/2006 |
|---|---|---|
| JP | 2002-267893 A | 9/2002 |
| JP | 2008-263240 A | 10/2008 |
| JP | 2018-180513 A | 11/2018 |

* cited by examiner

*Primary Examiner* — James A Dudek
(74) *Attorney, Agent, or Firm* — Oliff PLC

(57) ABSTRACT

An optical device is provided, the optical device having a laminated substrate in which a plurality of functional layers are laminated, and an optical part and an electronic part disposed on the laminated substrate, wherein one of the functional layers is a first functional layer that the optical part is placed one, and one of other of the functional layers is a second functional layer that is disposed below the first functional layer and the electronic part is placed on, a first wiring is provided on one surface of the first functional layer and a second wiring is provided on one surface of the second functional layer, and a connection terminal of the electronic part is electrically connected to both of the first wiring and the second wiring via a conductive material.

2 Claims, 13 Drawing Sheets

OPTICAL DEVICE AND METHOD OF MOUNTING ELECTRONIC PART

CROSS-REFERENCES TO RELATED APPLICATIONS

This application relies for priority upon Japanese Patent Application No. 2022-022061, filed on Feb. 16, 2022 the entire content of which is hereby incorporated herein by reference for all purposes as if fully set forth herein.

BACKGROUND

The present disclosure relates to an optical device, and a method of mounting electronic part.

In recent years, attention has come to be focused on augmented reality (AR) glasses and miniaturized projectors, and attention has also increasing on small-sized Planar Lightwave Circuits (PLC) or the like using laser diodes. These laser diodes are capable of drawing images with high efficiency energy.

For example, Patent Document 1 discloses a light source with a monitoring function capable of using a miniaturized projector. The light source with a monitoring function disclosed in Patent Document 1 has a detection element using a semiconductor photodiode (PD). The semiconductor photodiode monitors an optical output. The light source with a monitoring function disclosed in Patent Document 1 adjusts a white balance based on monitoring results of the optical output.

The semiconductor photodiode is an axial lead type referred to as a CAN type, a surface mount device (SMD) type mounted on a substrate, or the like. When the semiconductor photodiode is accommodated in a compact package of an optical device (light source module) such as a light source with a monitoring function or the like, since the CAN type is physically large and not suitable for miniaturization, the SMD type is used.

In general, the SMD type semiconductor photodiode has an external form such as a rectangular parallelepiped shape, a light receiving surface is provided on one surface side, and a connection terminal (electrode terminal) is provided on the other surface side. Such an SMD type semiconductor photodiode is mounted such that the light receiving surface or the connection terminal is perpendicular to one surface of a mounting substrate when an optical axis of incident light is in a direction along one surface of the mounting substrate.

When the above-mentioned semiconductor photodiode is mounted on the one surface of the mounting substrate, in order to electrically connect a winding pattern extending along the one surface of the mounting substrate and a connection terminal extending perpendicular to the one surface of the mounting substrate, for example, a conductive material is formed to fill these gaps using a conductive resin such as silver paste or the like.

PATENT DOCUMENTS

Patent Document 1

Japanese Unexamined Patent Application, First Publication No. 2018-180513

SUMMARY

However, since the conductive material that electrically connects the winding pattern and the connection terminal of the semiconductor photodiode, which are described above, has fluidity upon formation, a formed shape has a cross section that reduces in size upward, for example, a conical shape or the like, and a contact area with the connection terminal of the semiconductor photodiode becomes smaller. For this reason, there is a problem that an electrical connection error is likely to occur between the winding pattern of the mounting substrate and the connection terminal of the semiconductor photodiode.

In consideration of the above-mentioned circumstances, the present disclosure is directed to providing an optical device, and a method of mounting an electronic part, which are capable of reliably connecting a wiring disposed along one surface of a substrate and a connection terminal of an electronic part extending perpendicular to the one surface of the substrate with no connection error.

An aspect of the present disclosure is an optical device having a laminated substrate in which a plurality of functional layers are laminated, and an optical part and an electronic part disposed on the laminated substrate, wherein one of the functional layers is a first functional layer that the optical part is placed one, and one of other of the functional layers is a second functional layer that is disposed below the first functional layer and the electronic part is placed on, a first wiring is provided on one surface of the first functional layer and a second wiring is provided on one surface of the second functional layer, and a connection terminal of the electronic part is electrically connected to both of the first wiring and the second wiring via a conductive material.

According to the present disclosure, even when the connection terminal of the electronic part is mounted to extend perpendicular to an extension direction of the second wiring extending along the one surface of the second functional layer that is a mounting surface, it is possible to prevent a connection error of the connection terminal of the electronic part. That is, conduction through the connection terminal can be reliably ensured by connecting the connection terminal to both of the first wiring and the second wiring that are wires with the same function via the conductive material.

In the above-described aspect of the present disclosure, the first wiring and the second wiring may be electrically connected by an interlayer connection wiring provided on the laminated substrate.

In the above-described aspect of the present disclosure, a sub cavity for mounting a component penetrating through the first functional layer may be formed in the first functional layer, and the electronic part may be placed in the sub cavity for mounting a component.

In addition, in the embodiment of the present disclosure, the conductive material may be interposed between an inner circumferential surface of the sub cavity for mounting a component and the connection terminal.

In the above-described aspect of the present disclosure, an end portion of the first wiring may be located at a position retracted from the inner circumferential surface of the sub cavity for mounting a component.

In the above-described aspect of the present disclosure, an notch cutout in a direction in which the sub cavity for mounting a component extends may be formed at a position adjacent to the end portion of the wiring of the first functional layer In the above-described aspect of the present disclosure, in a region exposed from the sub cavity for mounting a component in the second functional layer, a blind hole that is recessed in a thickness direction may be formed, and a part-fixing resin-layer that is filled in the blind hole and comes into contact with at least a bottom portion of the electronic part may be formed.

In the above-described aspect of the present disclosure, the conductive material may be a conductive resin.

In the above-described aspect of the present disclosure, the electronic part may be a photodetector, and the optical part may include an optical waveguide, which is optically connected such that the photodetector receives at least some of light that propagates through the optical waveguide.

Another aspect of the present disclosure is a method of mounting an electronic part on a laminated substrate including a first functional layer having one surface on which a first wiring is provided, and a second functional layer disposed below the first functional layer and having one surface on which a second wiring is provided, and a sub cavity for mounting a component penetrating through the first functional layer and exposing the one surface of the second functional layer being formed, the method including the steps of: mounting an electronic part in a predetermined location on the one surface of the second functional layer by inserting the electronic part in a sub cavity for mounting a component; and electrically connecting a connection terminal of the electronic part, the first wiring and the second wiring by providing a conductive material between the connection terminal, the first wiring and the second wiring.

In the above-described aspect of the present disclosure, in the step of electrically connecting, a conductive resin may be used as the conductive material, a space between the connection terminal and an inner circumferential surface of the sub cavity for mounting a component may be filled with the conductive resin, and the one connection terminal of the electronic part may be electrically connected to the first wiring and the second wiring.

According to the present disclosure, it is possible to provide an optical device, and a method of mounting a electronic part, which are capable of reliably connecting a wiring disposed along one surface of a substrate and a connection terminal of the electronic part extending perpendicular to the one surface of the substrate with no connection error.

DETAILED DESCRIPTION

Figure 1:
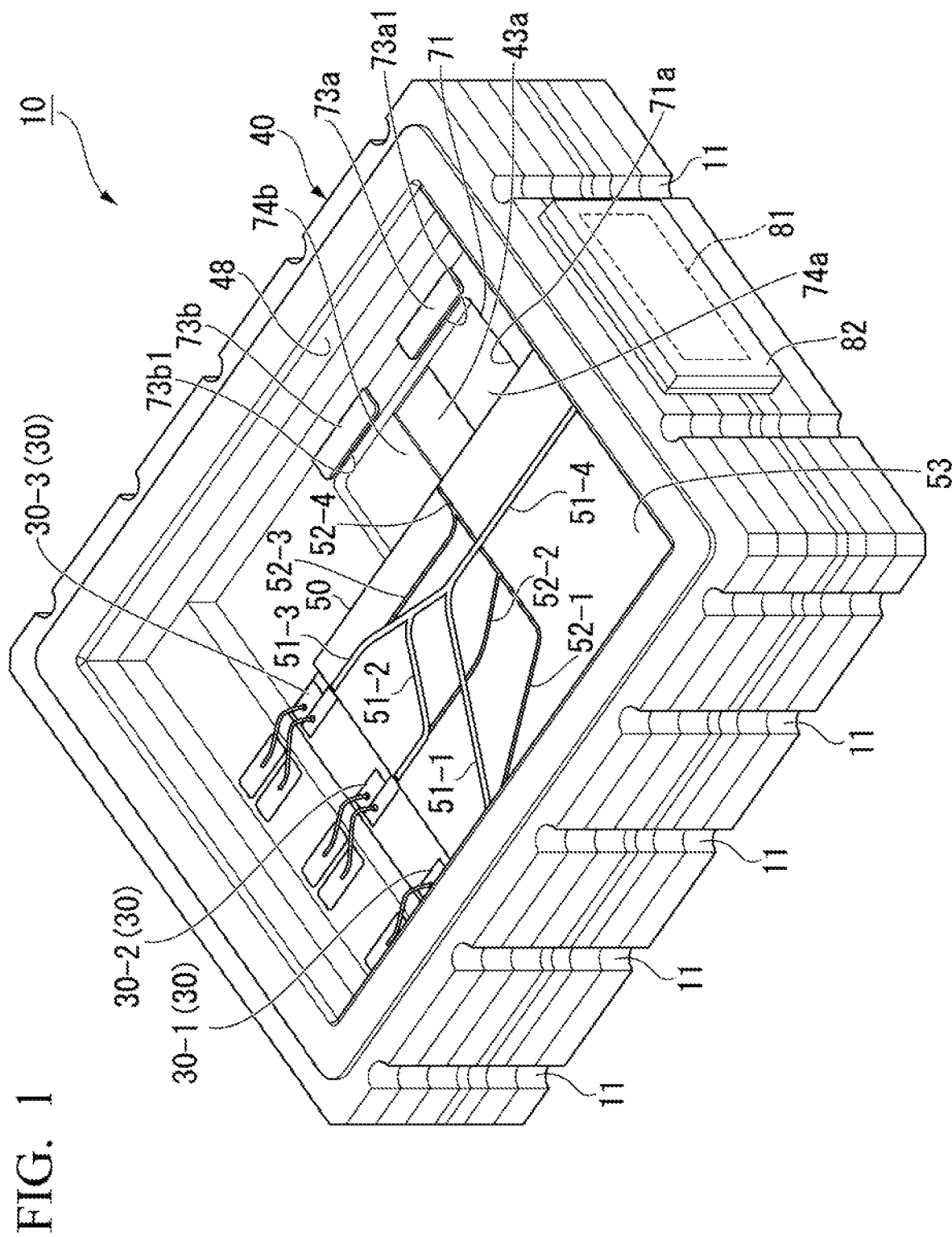
FIG. 1 is an external perspective view showing an aspect of the inside of an optical device of a first embodiment of the present disclosure from above.

Hereinafter, an optical device, and a method of mounting an electronic part, which are embodiments to which the present disclosure is applied, will be described with reference to the accompanying drawings. Further, the following embodiments are specifically described for better understanding of the spirit of the present disclosure, and are not intended to limit the present disclosure unless otherwise specified. In addition, in the drawings used in the following description, in order to make it easier to understand the features of the present disclosure, main portions may be enlarged for convenience, and dimensional ratios or the like of the components may not be necessarily the same as the actual ones.

Optical Device: First Embodiment

In the following embodiments, as an example of an optical device, a light source with a monitoring function unit (hereinafter, may be referred to as a light source unit) that can be suitably used for AR glasses or miniaturized projectors will be exemplarily described.

Figure 2:
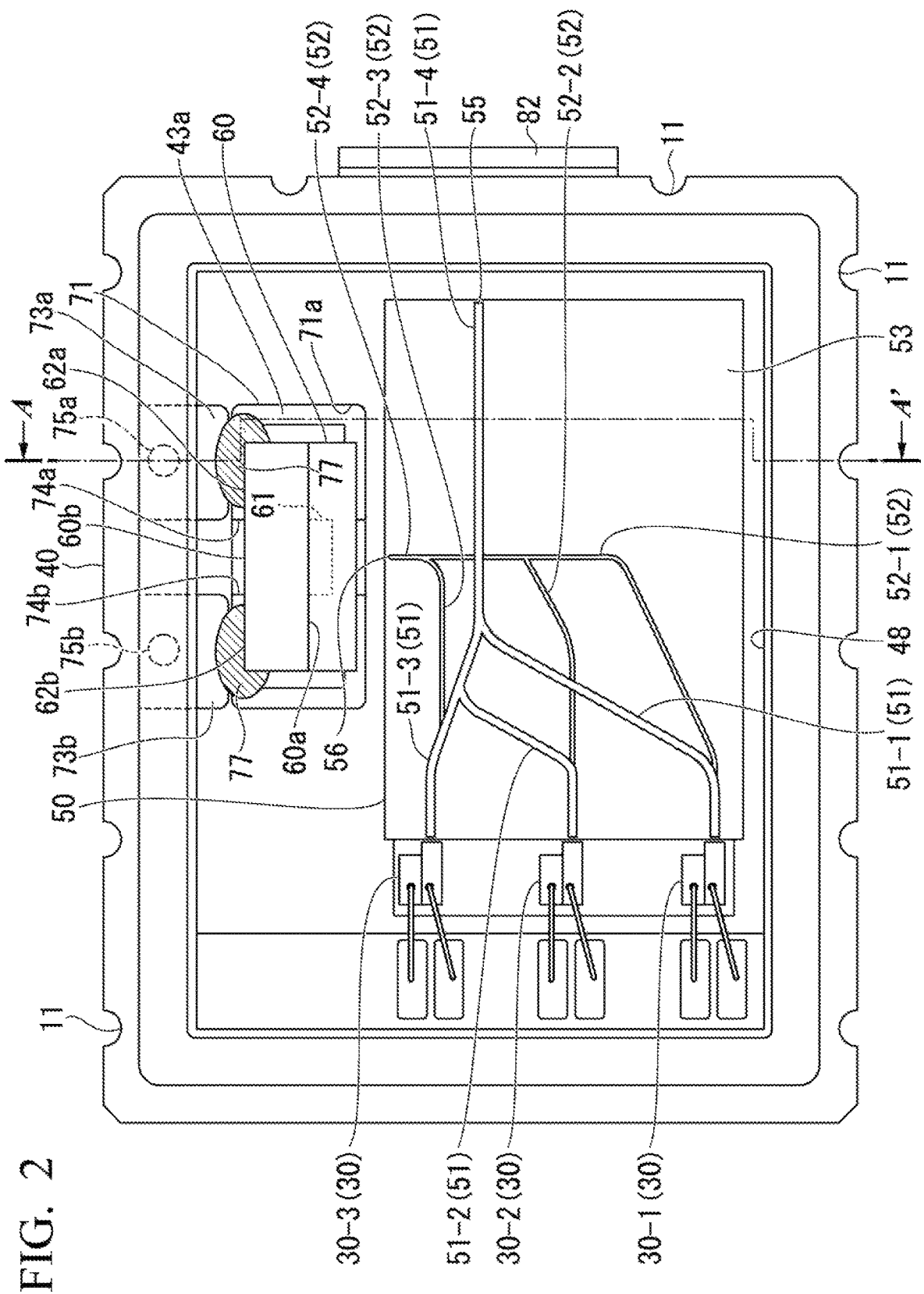
FIG. 2 is a plan view showing an aspect of the inside of the optical device of FIG. 1 from above.
Figure 3:
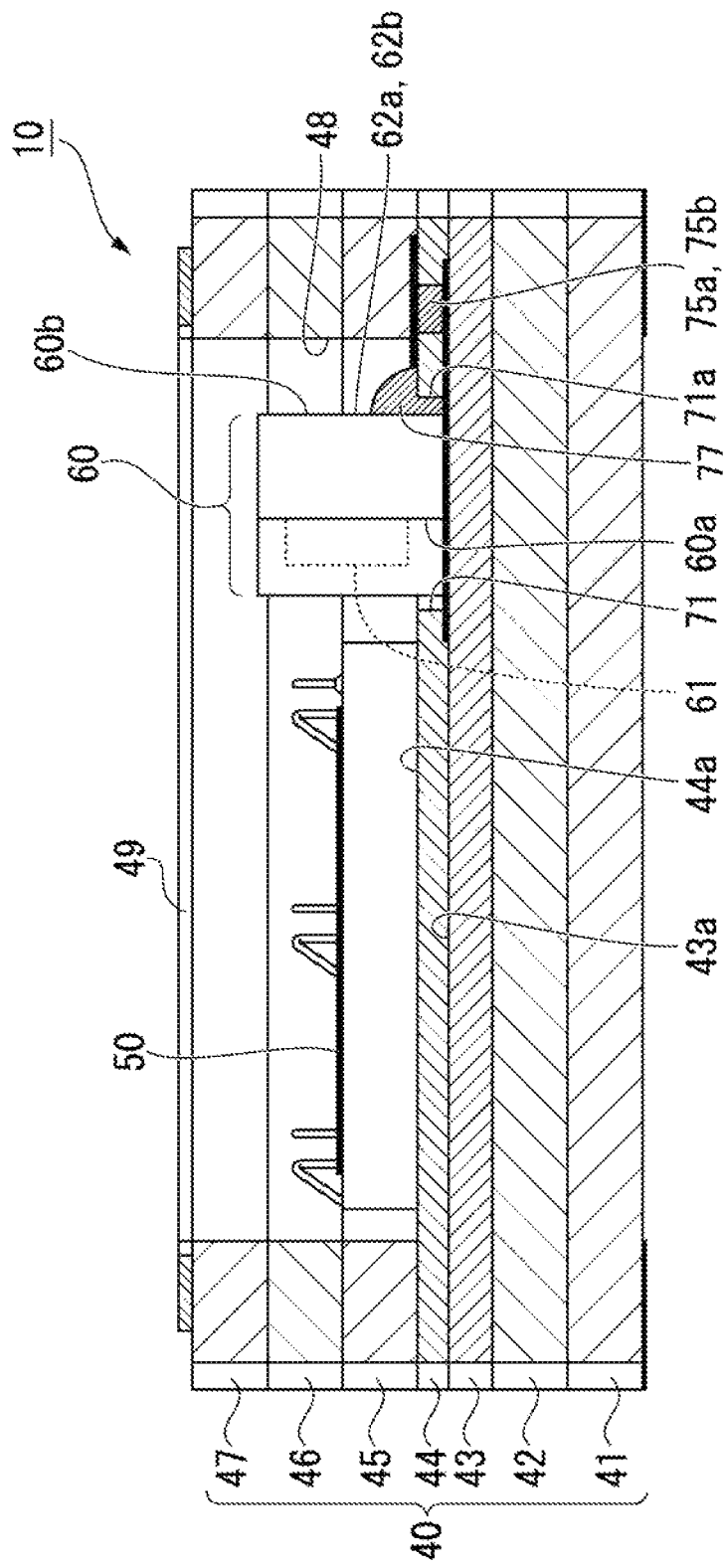
FIG. 3 is a cross-sectional view of a laminated substrate that constitutes the optical device along line A-A' in FIG. 2.

FIG. 1 is an external perspective view showing an aspect when the inside of an optical device of a first embodiment of the present disclosure is seen from above. In addition, FIG. 2 is a plan view showing an aspect when the inside of the optical device of FIG. 1 is seen from above. FIG. 3 is a cross-sectional view of a laminated substrate that constitutes the optical device along line A-A' in FIG. 2.

A light source unit (optical device) 10 of the embodiment is a multiplexer that combines colors of light of red (R), green (G) and blue (B), which are three primary colors of light. Such an optical device 10 is used, for example, as a multiplexer mounted on a head mount display.

The light source unit 10 has a laminated substrate 40, an optical semiconductor element (LD) 30 provided on the laminated substrate 40, a PLC (optical parts) 50 that is an optical waveguide, and a photodetector (electronic part) 60.

The laminated substrate 40 is obtained by laminating a plurality of functional layers, i.e., seven functional layers 41 to 47 in sequence from a bottom layer in the embodiment, and a cavity portion 48 with a wall-like periphery and a hollow interior is formed in the functional layers 45 to 47 among these. According to the above-mentioned configuration, the laminated substrate 40 forms a cavity structure in which the LD 30, the PLC 50, and the photodetector 60 are accommodated in the cavity portion 48. In addition, an upper opening surface of the cavity portion 48 is covered with a lid body (not shown) constituted by, for example, a metal plate or the like. The lid body may be fixed by resistance welding to a metal frame formed on the functional layer 47 through nickel plating.

An opening 81 having a surface covered with a cover glass 82 is formed in one of sidewalls that partition the cavity portion 48. Such an opening 81 is a window through which three-color light (projection light) emitted from a main core of the PLC 50 is emitted toward the outside of the cavity portion 48. The inside of the cavity portion 48 is kept airtight, and purged with, for example, an inert gas. Further, a collimating lens or the like may be further disposed inside of the opening 81.

The LD (optical semiconductor element) 30 is constituted by an LD 30-1 configured to emit red light, an LD 30-2 configured to emit green light, and an LD 30-3 configured to emit blue light. The LDs 30-1, 30-2 and 30-3 are disposed at predetermined intervals in a direction substantially perpendicular to an emission direction of light emitted from each LD 30, and may be provided on, for example, an upper surface of a sub-carrier.

Further, needless to say, the LD 30 can use lights other than red (R), green (G) and blue (B) shown in the embodiment, and red (R), green (G) and blue (B) are not necessarily in this order and may be changed as appropriate.

In addition, for example, red light with a peak wavelength of 605 nm or more and 750 nm or less can be used, green light with a peak wavelength of 495 nm or more and 570 nm or less can be used, and blue light with a peak wavelength of 405 nm or more and 494 nm or less can be used.

The plurality of functional layers 41 to 47 that constitute the laminated substrate 40 may be constituted by ceramic thin plates that are, for example, dielectric substances. Accordingly, the light source unit 10 is formed as a ceramic package. Further, a semi-cylindrical notch 11 referred to as a caster may be formed in an outer circumferential surface of the light source unit 10. Such a notch can allow visual confirmation of solder creeping up to the notch 11 when the light source unit 10 is fixed to a mounting substrate or the like by, for example, solder, and thus reliability of the mounting of the light source unit 10 can be improved.

In the embodiment, among the plurality of functional layers 41 to 47, a third functional layer from the bottom forms a second functional layer 43 that supports the photodetector (electronic part) 60, and a fourth functional layer from the bottom forms a first functional layer 44 that supports the PLC (optical parts) 50.

The PLC (optical parts) 50 is formed by a semiconductor process including known photolithography or dry etching used when a fine structure such as an integrated circuit or the like is formed using a quartz plate. The PLC 50 has main cores (optical waveguides) 51-1, 51-2 and 51-3 corresponding to the LDs 30-1, 30-2 and 30-3, respectively, sub-cores (optical waveguides) 52-1, 52-2 and 52-3 diverging in the middle of routes of the main cores 51-1, 51-2 and 51-3, respectively, and a clad 53 that surrounds the main cores 51 and the sub-cores 52.

Then, main cores 51-1, 51-2 and 51-3 merge into one after the sub-cores 52-1, 52-2 and 52-3 diverge in a propagation direction of the light, and reach a main emission end 55 of the PLC 50 as a multiplexing main core 51-4. Such as a main emission end 55 of the multiplexing main core 51-4 faces the opening 81, and main emission light obtained by multiplexing the three-color light is emitted to the outside of the cavity portion 48 via, for example, the cover glass 82 or the like of the opening 81.

Meanwhile, the sub-cores 52-1, 52-2 and 52-3 merge into one in the propagation direction of the light and reach a sub emission end 56 of the PLC 50 as a multiplexing sub-core 52-4. Such a sub emission end 56 of the multiplexing sub-core 52-4 is disposed to face a light receiving surface 61 of the photodetector (electronic part) 60, which will be described below, and the light emitted from the sub emission end 56 enters the photodetector (electronic part) 60. That is, the photodetector (electronic part) 60 is disposed to face light that propagates through the multiplexing sub-core 52-4. Further, the sub emission end 56 and the light receiving surface 61 may be optically connected to each other.

A thickness of the clad 53 and a width direction dimension of each of the main cores 51 and the sub-cores 52 are not particularly limited. For example, the main cores 51 and the sub-cores 52 having a width direction dimension of about several microns are disposed in the clad 53 with a thickness of about 50 μm.

The main cores 51, the sub-cores 52, and the clad 53 are constituted by, for example, quartz, and refractive indices of the main cores 51 and the sub-cores 52 are higher than a refractive index of the clad 53 by a predetermined value. Accordingly, the light entering each of the main cores 51 and the sub-cores 52 propagates each core while being totally reflected by the interface between each core and the clad 53. The main cores 51 and the sub-cores 52 may each be doped with impurities such as germanium (Ge) or the like in an amount corresponding to the above-mentioned predetermined value.

In the PLC 50 having the above-mentioned configuration, the light output from the LDs 30-1, 30-2 and 30-3 enters the main cores (optical waveguides) 51-1, 51-2 and 51-3, and propagates toward the main emission end 55. At least a part of the propagating light is demultiplexed by the sub-cores 52-1, 52-2 and 52-3 in the middle of the propagation. Then, the light propagating through each of the main cores 51-1, 51-2 and 51-3 is multiplexed, and emitted from the main emission end 55 of the multiplexing main core 51-4 as main output light.

Meanwhile, the light demultiplexed from the main cores 51 and propagating through each of the sub-cores 52-1, 52-2 and 52-3 is also multiplexed and emitted from the sub emission end 56 of the multiplexing sub-core 52-4. The sub output light emitted from the sub emission end 56 is used as, for example, monitoring light for confirming light quantity, color tone, or the like, of the main output light, and enters the photodetector (electronic part) 60 to be photo-electrically converted.

The photodetector (electronic part) 60 forms an external form such as a rectangular parallelepiped shape, and is placed (mounted) on one surface 43a of the second functional layer 43 of the laminated substrate 40. The light receiving surface 61 is formed on one vertical surface 60a of the photodetector (electronic part) 60 perpendicular to the one surface 43a of the second functional layer 43 in a mounting state. In addition, a pair of connection terminals 62a and 62b are formed on the other vertical surface 60b facing the one vertical surface 60a. Such connection terminals 62a and 62b may be flat metal plates extending perpendicular to the one surface 43a of the second functional layer 43.

A sub cavity for mounting a component 71 configured to expose the one surface 43a of the second functional layer 43 is formed in the first functional layer 44 of the laminated substrate 40. Such a sub cavity for mounting a component 71 is formed at a position overlapping the mounting position of the photodetector 60, and the photodetector 60 is mounted to pass through the sub cavity for mounting a component 71. Accordingly, the connection terminals 62a and 62b are formed to extend parallel to an inner circumferential surface 71a of the sub cavity for mounting a component 71 in a state in which the photodetector 60 is mounted.

Further, when the first functional layer 44 and the second functional layer 43 are located at separated positions, and for example, one or two more functional layers are further laminated between the first functional layer 44 and the second functional layer 43, the sub cavity for mounting a component 71 can be formed to pass through the first functional layer 44 and another functional layer.

On the second functional layer 43, a second wiring 74a electrically connected to one connection terminal 62a of the photodetector 60 and a second wiring 74b electrically connected to the other connection terminal 62b of the photodetector 60 are formed. The second wirings 74a and 74b are partially exposed from the first functional layer 44 in the opening region of the sub cavity for mounting a component 71.

Meanwhile, a first wiring 73a electrically connected to the one connection terminal 62a of the photodetector 60 and a first wiring 73b electrically connected to the other connection terminal 62b of the photodetector 60 are also formed on the first functional layer 44.

The first wirings 73a and 73b and the second wirings 74a and 74b may be, for example, tungsten wirings or molybdenum wirings, or may be formed to have a thickness of about 5 μm to 30 μm. In addition, electroless nickel plating can be performed on the tungsten wiring or the molybdenum wiring to form a thickness of about 1 μm to 10 μm, and further, electroless gold plating can be performed to form a thickness of about 1 μm to 4 μm.

Then, an interlayer connection wiring (via wiring) 75a electrically connected to the first wiring 73a and the second wiring 74a and an interlayer connection wiring (via wiring) 75b electrically connected to the first wiring 73b and the second wiring 74b are formed on the first functional layer 44. The interlayer connection wirings (via wirings) 75a and 75b can be formed by, for example, forming through-holes (via-holes) in the first functional layer 44 and filling the through-holes with an electric conductor.

Accordingly, the first wiring 73a and the second wiring 74a are two wirings diverged with the same function. Similarly, the first wiring 73b and the second wiring 74b are two wirings diverged with the same function.

Figure 4:
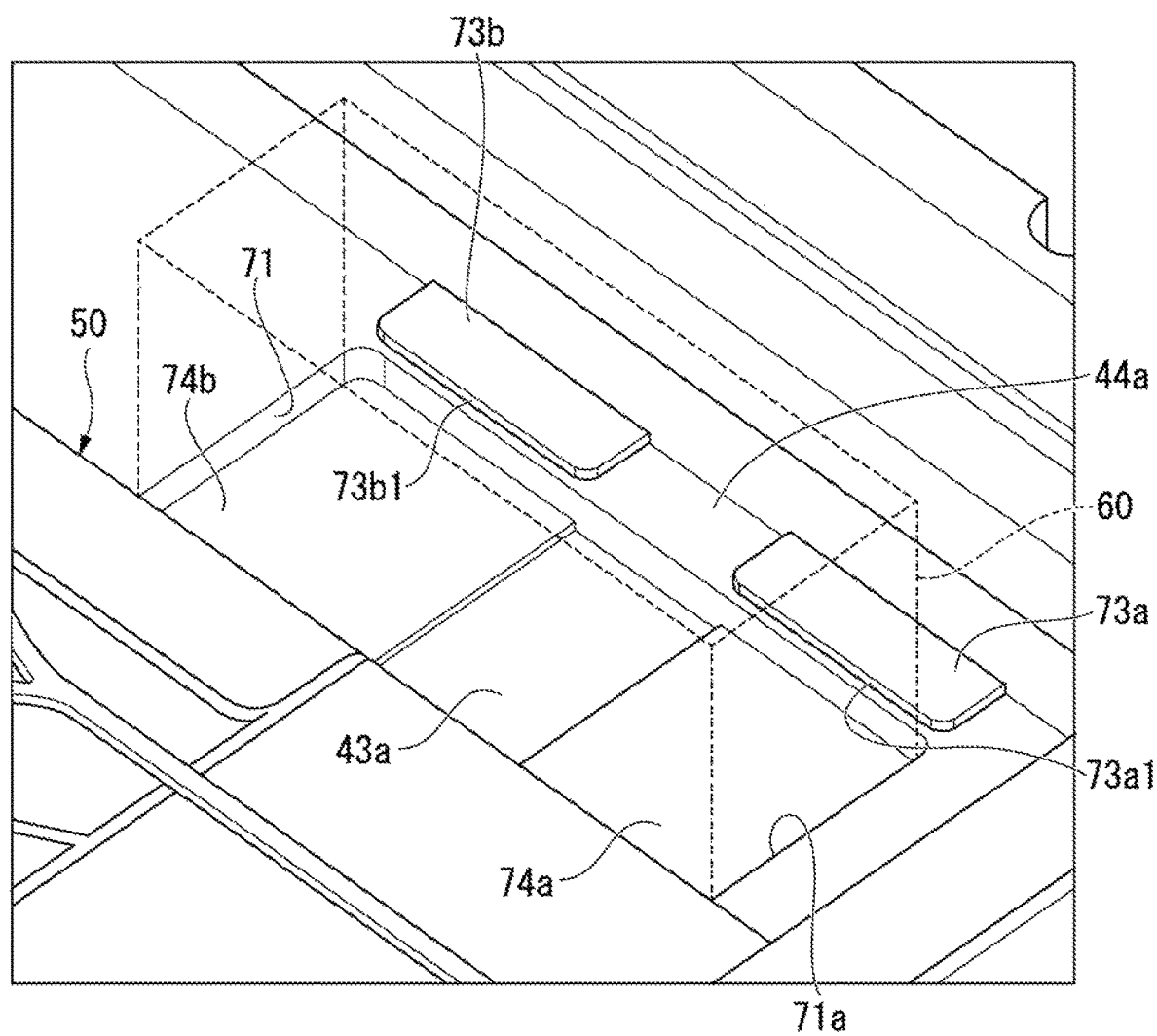
FIG. 4 is an enlarged perspective view of a major part showing a mounting part of an electronic part.

As shown in the enlarged view of the major part of FIG. 4, the first wirings 73a and 73b formed on one surface 44a of the first functional layer 44 are formed such that wiring end portions 73a1 and 73b1 on sides connected to the connection terminals 62a and 62b of the photodetector 60 by a conductive material 77 (to be described below) are located at positions facing the inner circumferential surface 71a of the sub cavity for mounting a component 71.

Figure 5:
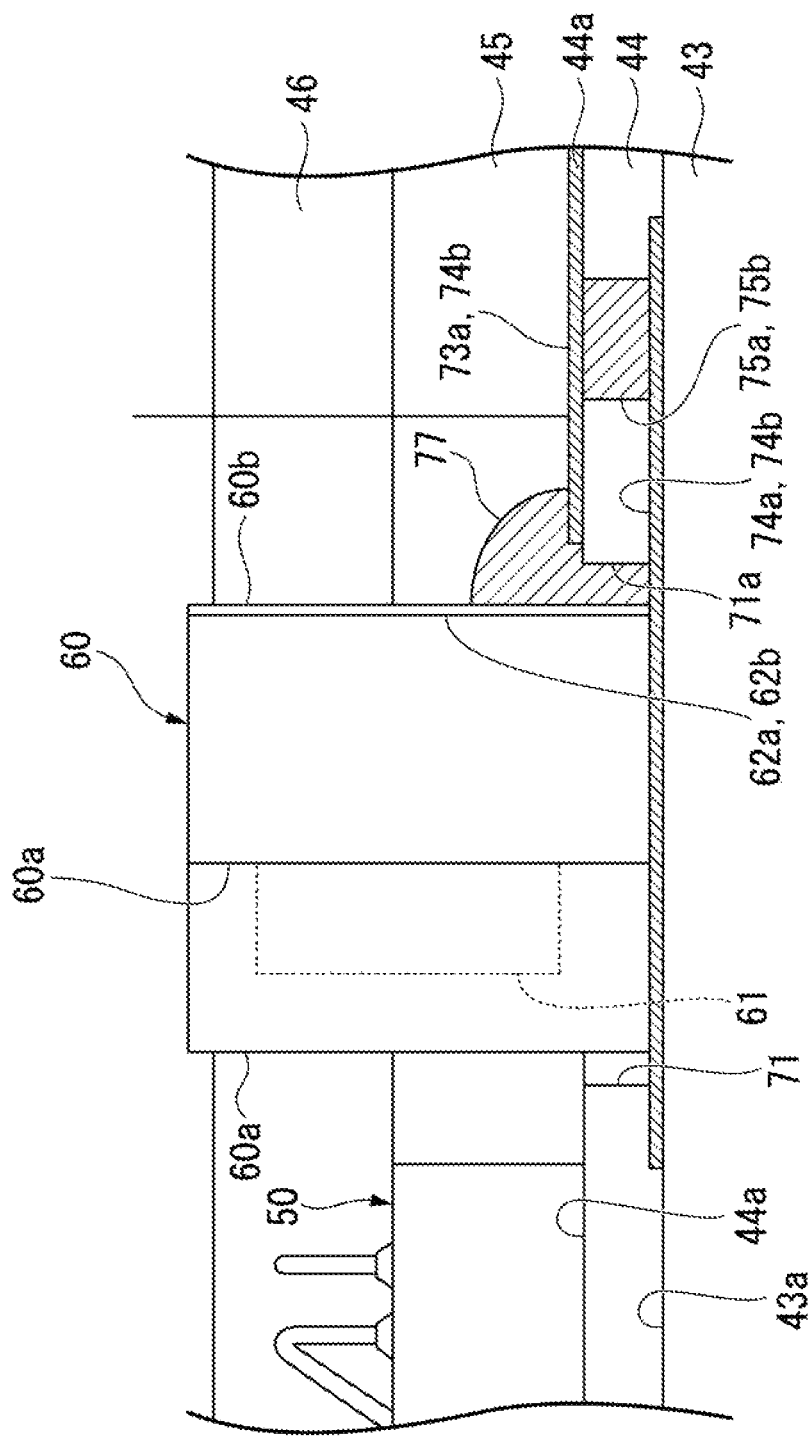
FIG. 5 is an enlarged cross-sectional view of a major part showing the mounting part of the electronic part.

As shown in the enlarged view of the major part of FIG. 5, the connection terminal 62a of the photodetector (electronic part) 60 is electrically connected to both of the first wiring 73a formed on the first functional layer 44 and the second wiring 74a formed on the second functional layer 43 via the conductive material 77.

Similarly, the connection terminal 62b of the photodetector (electronic part) 60 is electrically connected to both of the first wiring 73b formed on the first functional layer 44 and the second wiring 74b formed on the second functional layer 43 via the conductive material 77.

The conductive material 77 is formed to fill gaps between the connection terminals 62a and 62b of the photodetector (electronic part) 60 extending in the laminating direction and the inner circumferential surface 71a of the sub cavity for mounting a component 71, comes into contact with the second wirings 74a and 74b extending along the one surface 43a of the second functional layer 43 in a lower section, and comes into contact with the wiring end portions 73a1 and 73b1 of the first wirings 73a and 73b extending along the one surface 44a of the first functional layer 44 so as to cover them in an upper section.

The conductive material 77 can use a conductive resin such as silver paste obtained by mixing silver particles and a curable resin, copper paste obtained by mixing copper particles and a curable resin, or the like.

According to the light source unit (optical device) 10 of the embodiment having the above-mentioned configuration, even when the connection terminals 62a and 62b of the photodetector (electronic part) 60 are mounted to extend perpendicular to the extension direction of the second wirings 74a and 74b extending along the one surface 43a of the second functional layer 43 that is the mounting surface, it is possible to prevent a connection error between the connection terminals 62a and 62b of the photodetector (electronic part) 60.

That is, conduction through the connection terminal 62a can be reliably performed by connecting the one connection terminal 62a to both of the first wiring 73a and the second wiring 74a that are wirings having the same function via the conductive material 77. Similarly, conduction through the connection terminal 62b can be reliably performed by connecting the one connection terminal 62b to both of the first wiring 73b and the second wiring 74b that are wirings having the same function via the conductive material 77.

In addition, since the conductive material 77 extends in narrow gaps between the connection terminals 62a and 62b and the inner circumferential surface 71a of the sub cavity for mounting a component 71, has a small change in formation width in the upward/downward direction, and formed to cover each of the wiring end portions 73a1 and 73b1 of the first wirings 73a and 73b from above, a wide contact area is secured for each of the first wirings 73a and 73b and the second wirings 74a and 74b, and conduction can be reliably achieved.

Further, while the first functional layer 44 and the second functional layer 43 are formed as adjacent layers in the embodiment, the first functional layer 44 and the second functional layer 43 may be provided at separated positions, and for example, one or two or more functional layers may be further laminated between the first functional layer 44 and the second functional layer 43.

In addition, while the second functional layer 43 is configured as a third layer and the first functional layer 44 is formed as a fourth layer from a bottom layer of the laminated substrate 40 in the embodiment, a position of the first functional layer or the second functional layer in the laminated substrate is not limited, and at least the second functional layer may be disposed below the first functional layer.

Optical Device: Second Embodiment

A light source unit (optical device) of a second embodiment of the present disclosure will be described. Further, the same components as the first embodiment are designated by the same reference signs and overlapping description thereof will be omitted.

Figure 6:
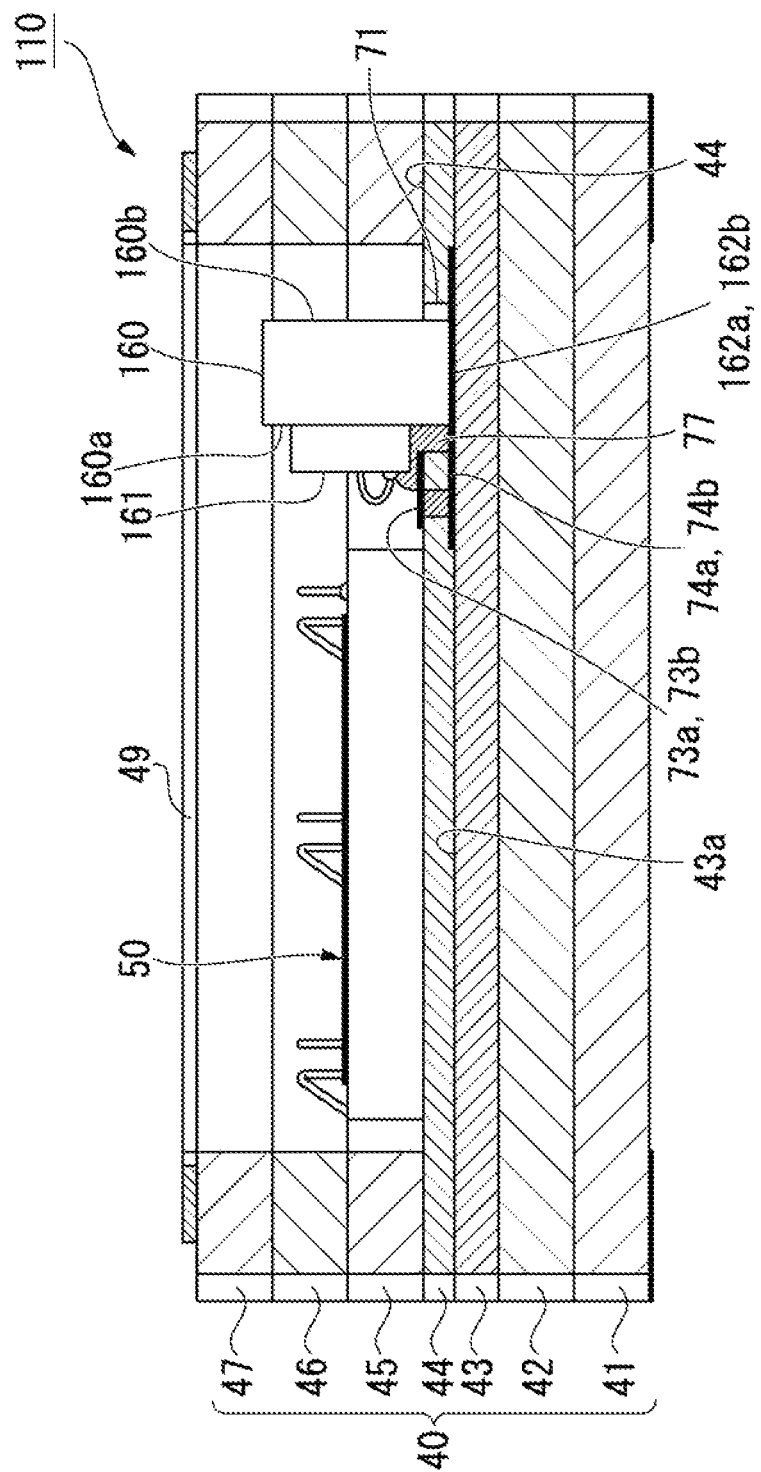
FIG. 6 is a cross-sectional view showing a light source unit (optical device) of a second embodiment corresponding to a position along line A-A' in FIG. 2.
Figure 7:
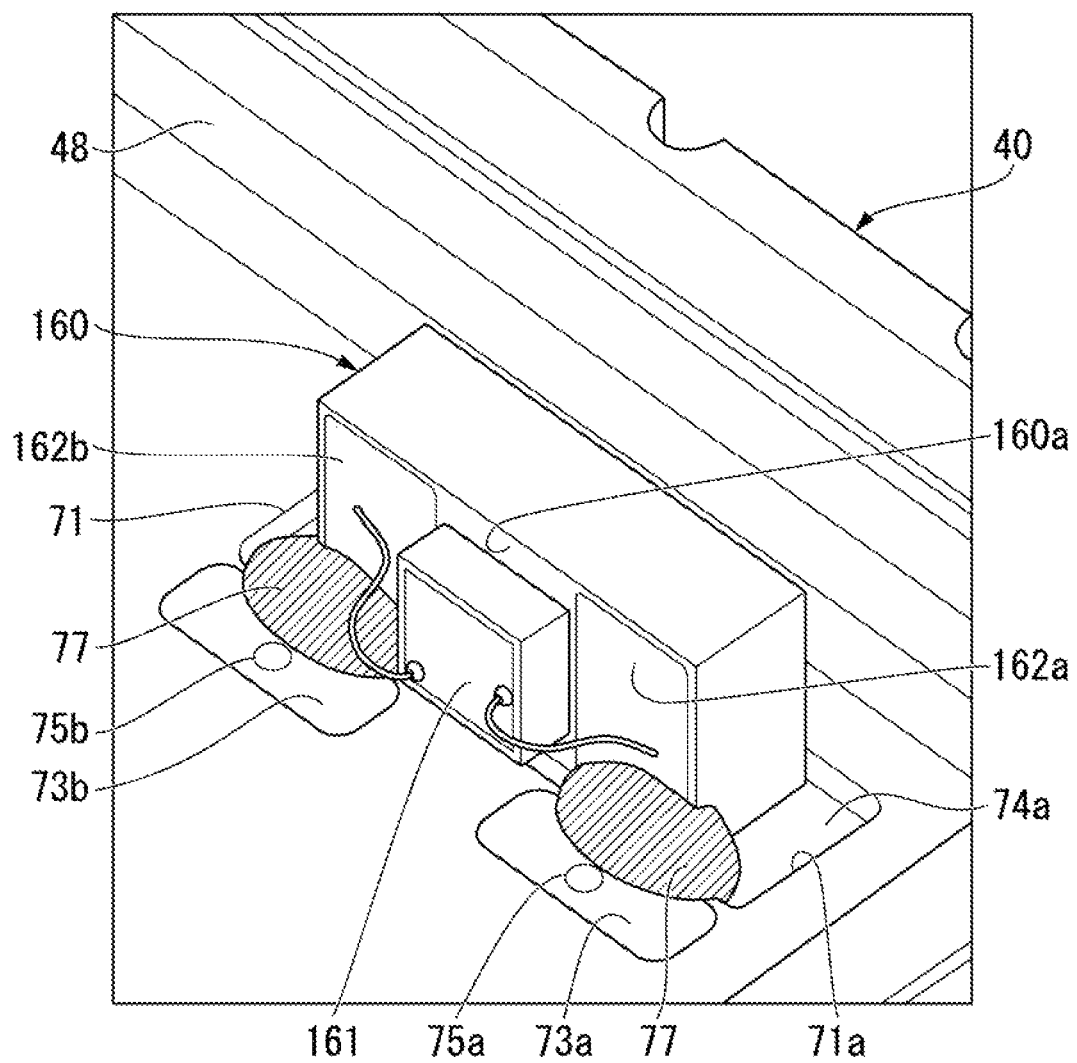
FIG. 7 is an enlarged perspective view of a major part showing the mounting part of the electronic part.

FIG. 6 is a cross-sectional view showing the light source unit (optical device) of the second embodiment corresponding to a position along line A-A' in FIG. 2. In addition, FIG. 7 is an enlarged perspective view of a major part showing a mounting part of an electronic part.

In a light source unit (optical device) 110 of the embodiment, a photodetector (electronic part) 160 placed (mounted) on the second functional layer 43 of the laminated substrate 40 is formed on one vertical surface 160a perpendicular to the one surface 43a of the second functional layer 43 together with both a light receiving surface 161 and a pair of connection terminals 162a and 162b. That is, the connection terminals 162a and 162b formed on both sides that sandwich the light receiving surface 161, respectively.

In addition, the second wiring 74a electrically connected to the one connection terminal 162a of the photodetector 160 and the second wiring 74b electrically connected to the other connection terminal 162b of the photodetector 160 are formed on the second functional layer 43. The second wirings 74a and 74b are partially exposed from the first functional layer 44 in the opening region of the sub cavity for mounting a component 71.

Meanwhile, the first wiring 73a electrically connected to the one connection terminal 162a of the photodetector 160 and the first wiring 73b electrically connected to the other connection terminal 162b of the photodetector 160 are also formed on the first functional layer 44. The first wirings 73a and 73b are formed to extend at a position facing the sub cavity for mounting a component 71 on a side facing the one vertical surface 160a of the photodetector (electronic part) 160.

Then, even in the embodiment, the one connection terminal 162a of the photodetector (electronic part) 160 is electrically connected to both of the first wiring 73a formed on the first functional layer 44 and the second wiring 74a formed on the second functional layer 43 via the conductive material 77.

Similarly, the other connection terminal 162b of the photodetector (electronic part) 160 is electrically connected to both of the first wiring 73b formed on the first functional layer 44 and the second wiring 74b formed on the second functional layer 43 via the conductive material 77.

The conductive material 77 is formed to fill a gap between the connection terminals 162a and 162b of the photodetector (electronic part) 160 extending in the laminating direction and the inner circumferential surface 71a of the sub cavity for mounting a component 71, comes into contact with the second wirings 74a and 74b extending along the one surface 43a of the second functional layer 43 in a lower section, and comes into contact with the wiring end portions 73a1 and 73b1 of the first wirings 73a and 73b extending along the one surface 44a of the first functional layer 44 in an upper section so as to cover them.

In this way, even when both of the light receiving surface 161 and the pair of connection terminals 162a and 162b of the photodetector (electronic part) 160 are formed on the one surface (one of the vertical surfaces 160a), conduction through the connection terminal 62a can be reliably performed by connecting both of the first wiring 73a and the second wiring 74a that are wirings with the same function to the one connection terminal 162a via the conductive material 77. Similarly, conduction through the connection terminal 62b can be reliably performed by connecting both of the first wiring 73b and the second wiring 74b that are wirings with the same function to the one connection terminal 162b via the conductive material 77.

Optical Device: Third Embodiment

A light source unit (optical device) of a third embodiment of the present disclosure will be described. Further, the same components as in the first embodiment are designated by the same reference signs and overlapping description thereof will be omitted.

Figure 8:
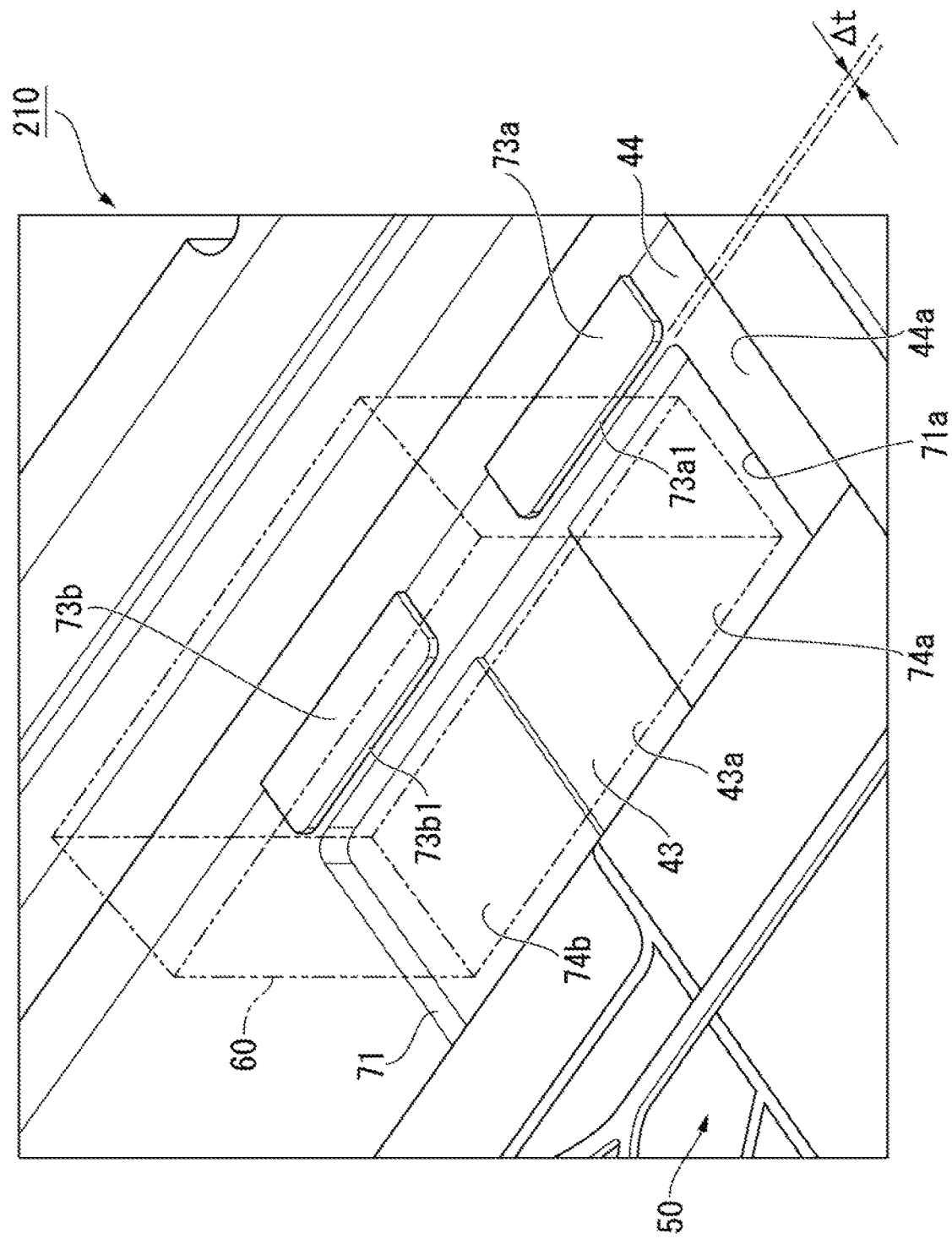
FIG. 8 is an enlarged perspective view of a major part showing a mounting part of an electronic part in a light source unit (optical device) of a third embodiment.

FIG. 8 is an enlarged perspective view of a major part showing a mounting part of an electronic part in a light source unit (optical device) of the embodiment.

In a light source unit (optical device) 210 of the embodiment, the wiring end portions 73a1 and 73b1 facing the sub cavity for mounting a components 71 of the first wirings 73a and 73b formed on the first functional layer 44 are formed to be located at positions retracted outward from the inner circumferential surface 71a of the sub cavity for mounting a component 71. An interval Δt between the inner circumferential surface 71a of the sub cavity for mounting a component 71 and the end surfaces of the wiring end portions 73a1 and 73b1 may be within, for example, a range of 0.1 mm to 0.5 mm.

According to the configuration of the above-mentioned embodiment, when the connection terminal of the photodetector is electrically connected to both of the first wirings 73a and 73b and the second wirings by the conductive material, since gaps are particularly formed between the inner circumferential surface 71a of the sub cavity for mounting a component 71 and the wiring end portions 73a1 and 73b1 of the first wirings 73a and 73b, a contacting portion of the conductive material can be increased, and the conductive material can be more strongly fixed to the connecting portion.

Optical Device: Fourth Embodiment

A light source unit (optical device) of a fourth embodiment of the present disclosure will be described. Further, the same components as in the first embodiment are designated by the same reference signs and overlapping description thereof will be omitted.

Figure 9:
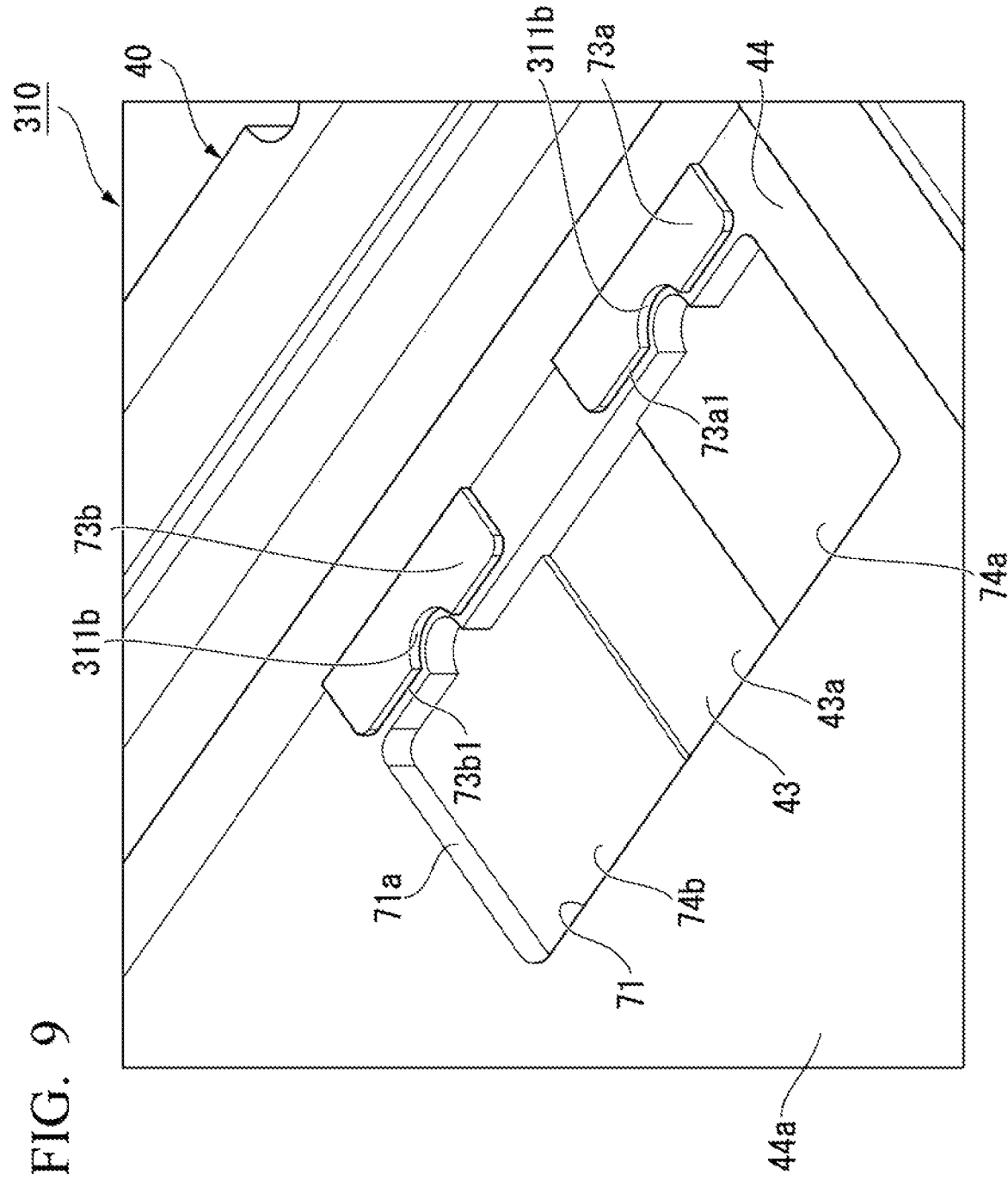
FIG. 9 is an enlarged perspective view of a major part showing a mounting part of an electronic part in a light source unit (optical device) of a fourth embodiment.
Figure 10:
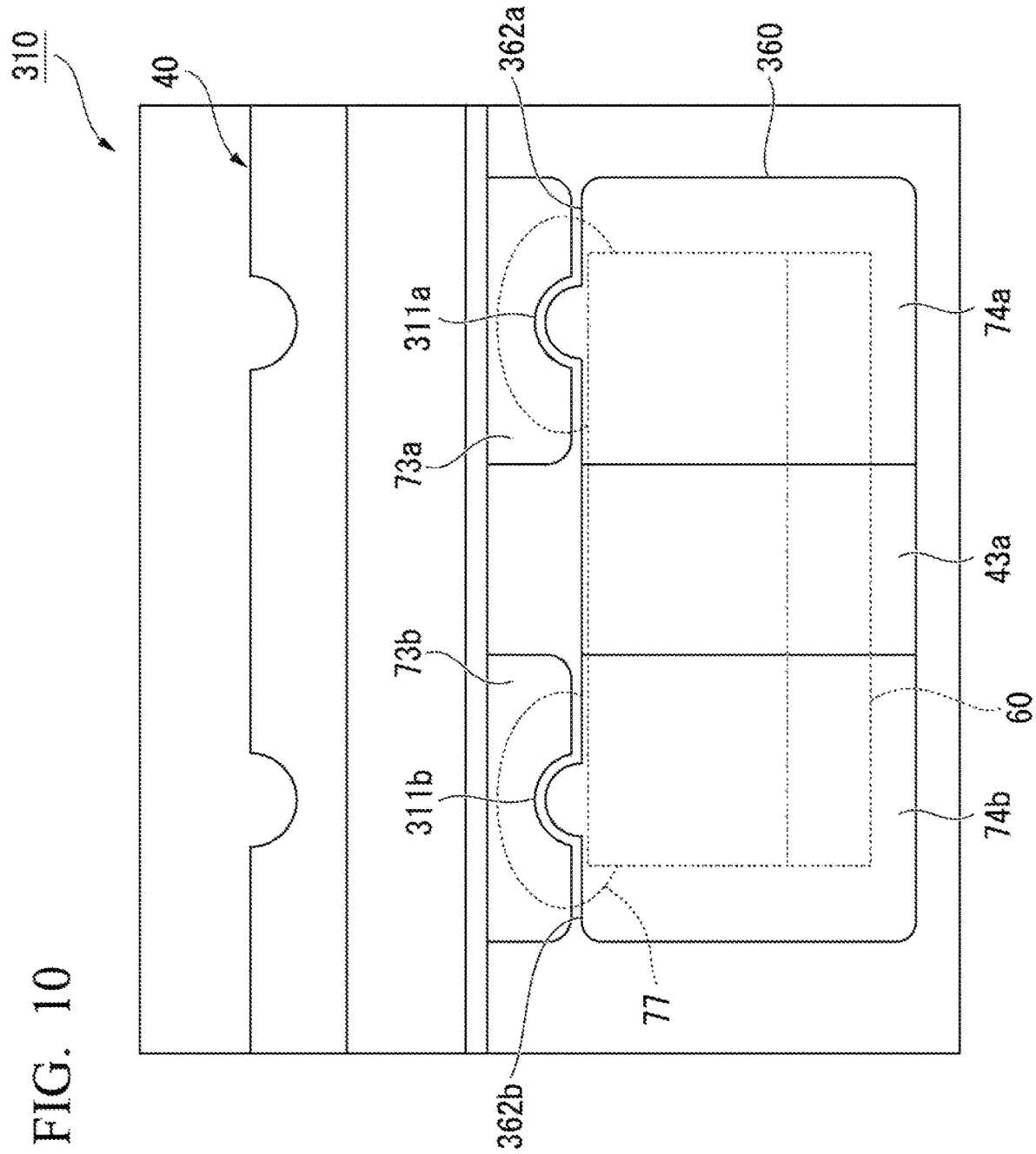
FIG. 10 is a plan view showing a state in which the electronic part of FIG. 9 is mounted from above.

FIG. 9 is an enlarged perspective view of a major part showing a mounting part of an electronic part in a light source unit (optical device) of the embodiment. In addition, FIG. 10 is a plan view showing a state in which the electronic part in FIG. 9 is mounted from above.

In a light source unit (optical device) 310 of the embodiment, notches 311a and 311b continuous with the inner circumferential surface 71a of the sub cavity for mounting a component 71 and extending in the laminating direction are formed in the wiring end portions 73a1 and 73b1 facing the sub cavity for mounting a components 71 of the first wirings 73a and 73b formed on the first functional layer 44, respectively.

The notches 311a and 311b, which are semi-cylindrical notches, for example, formed to cross the first functional layer 44 from the wiring end portions 73a1 and 73b1 of the first wirings 73a and 73b, respectively.

According to the configuration of the above-mentioned embodiment, when connection terminals 362a and 362b of a photodetector (electronic part) 360 are electrically connected by the conductive material 77 across both of the first wirings 73a and 73b and the second wirings, conduction between the connection terminals 362a and 362b of the photodetector (electronic part) 360 and the first wirings 73a and 73b and the second wirings can be secured to prevent the connection error by increasing the contact area with the conductive material 77.

In addition, upon formation of the conductive material 77, conduction between the first wirings 73a and 73b and the second wirings can be more reliably performed by flowing the conductive material 77 also into the notches 311a and 311b.

Optical Device: Fifth Embodiment

A light source unit (optical device) of a fifth embodiment of the present disclosure will be described. Further, the same components as in the first embodiment are designated by the same reference signs and overlapping description thereof will be omitted.

Figure 11:
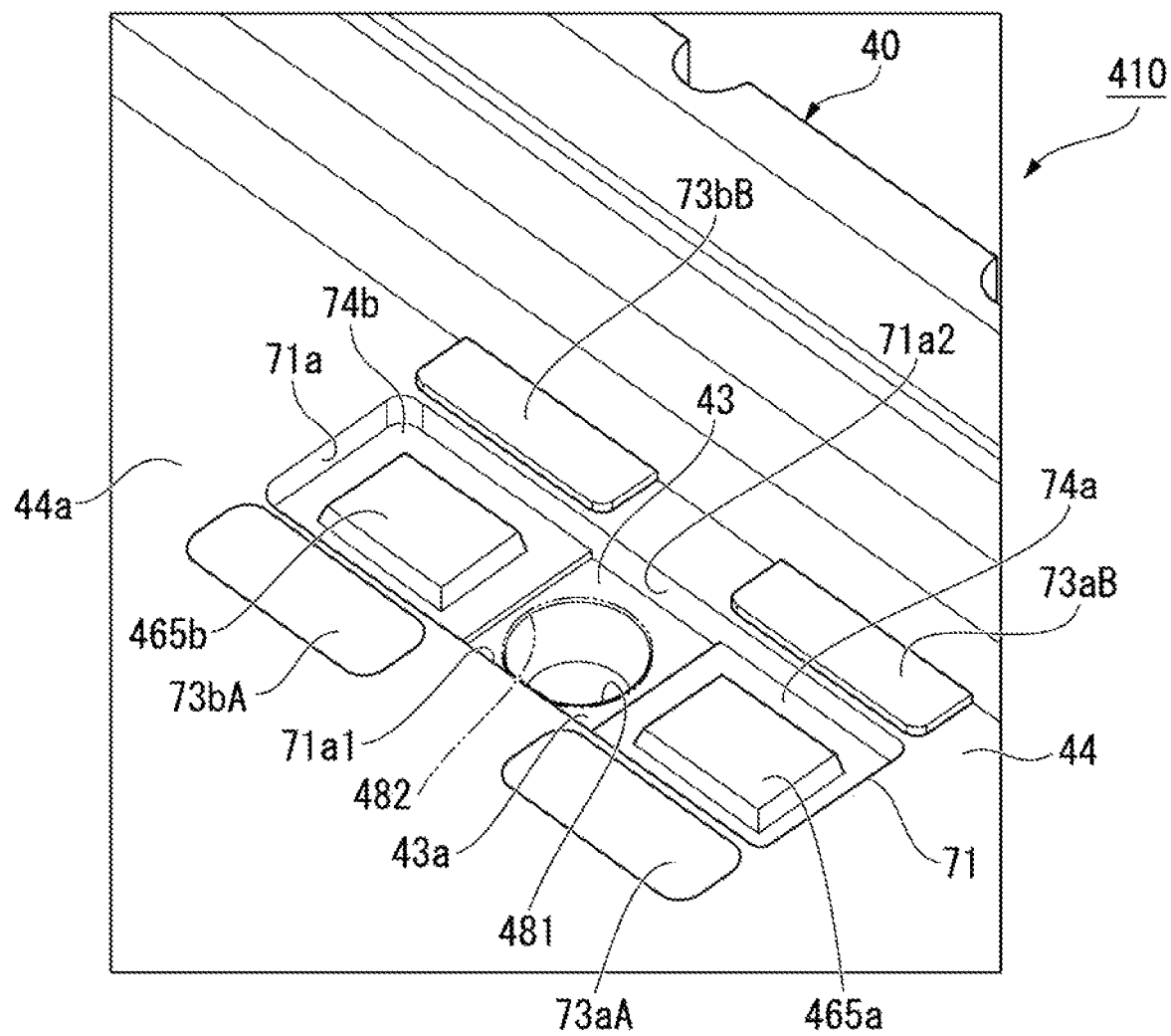
FIG. 11 is an enlarged perspective view of a major portion showing a mounting part of an electronic part in a light source unit (optical device) of a fifth embodiment.
Figure 12:
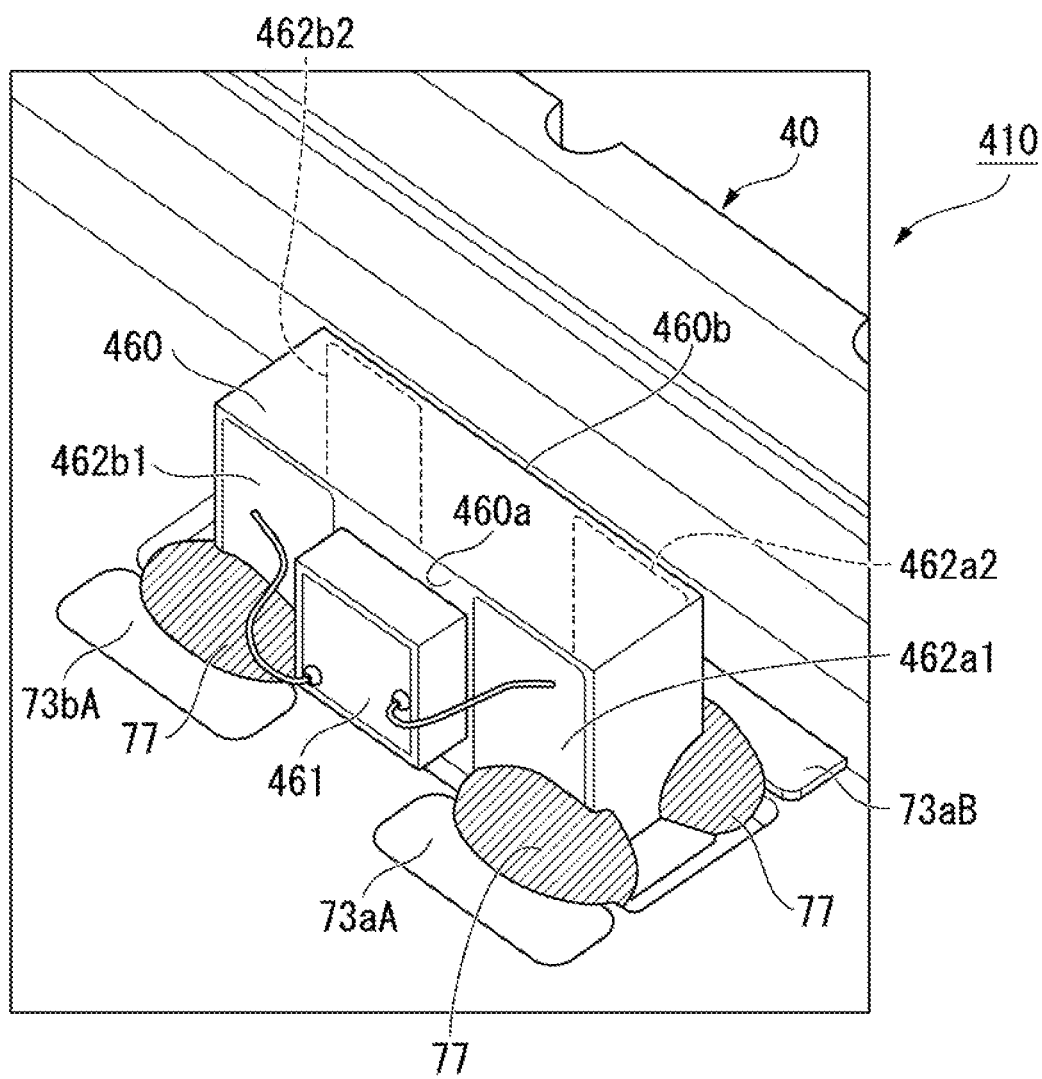
FIG. 12 is an enlarged perspective view of a major portion showing a state in which the electronic part of FIG. 11 is mounted.
Figure 13:
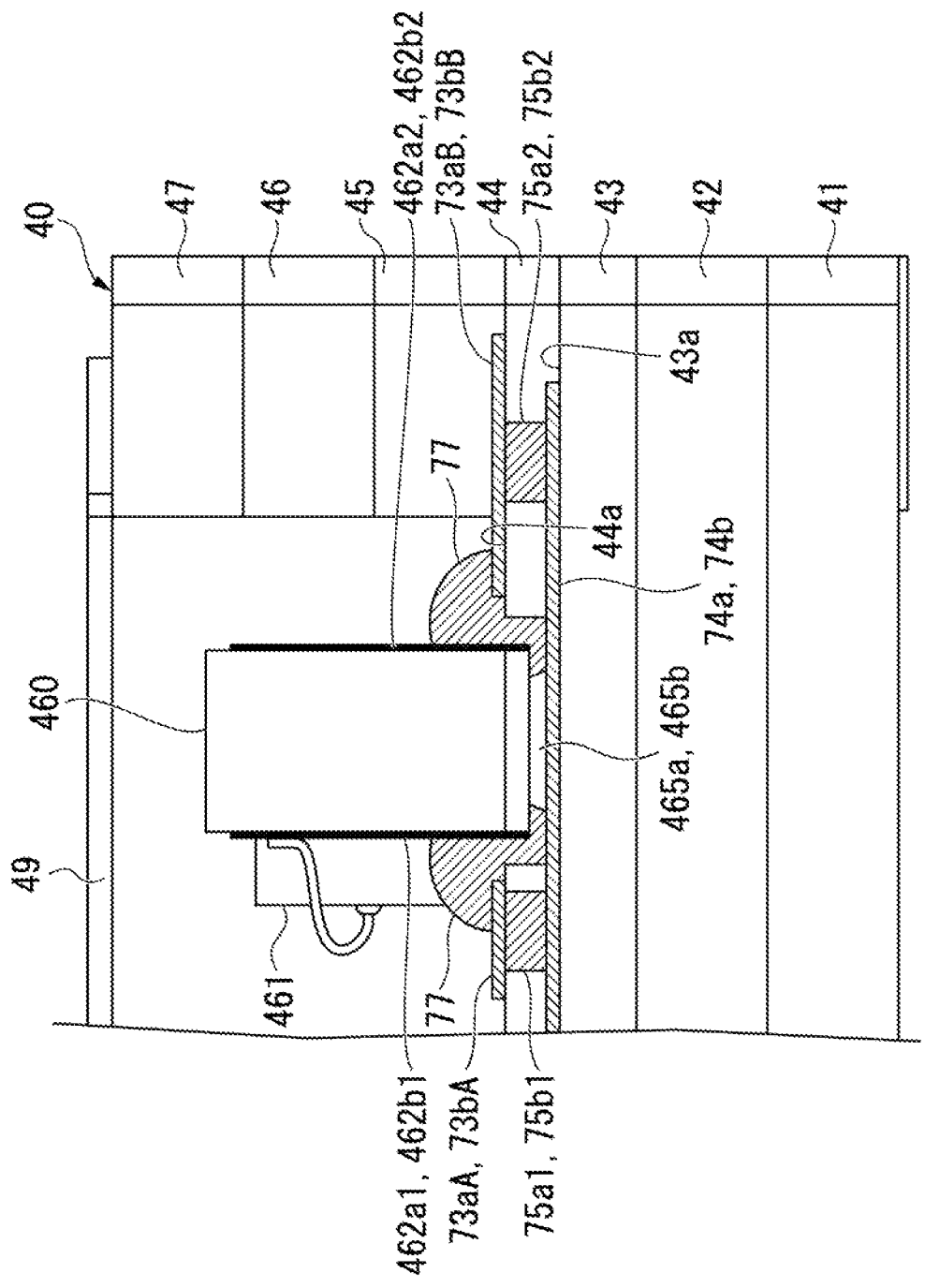
FIG. 13 is an enlarged cross-sectional view of the major portion in a laminating direction of the light source unit of the fifth embodiment.

FIG. 11 is an enlarged perspective view of a major part showing a mounting part of an electronic part in a light source unit (optical device) of the embodiment. In addition, FIG. 12 is an enlarged perspective view of a major part showing a state in which the electronic part in FIG. 11 is mounted. In addition, FIG. 13 is an enlarged cross-sectional view of a major part in the laminating direction of the light source unit of the embodiment.

In a light source unit (optical device) 410 of the embodiment, the first wirings 73aA and 73bA formed on the first functional layer 44 are formed to face one surface 71a1 of the inner circumferential surface 71a of the sub cavity for mounting a component 71, and the first wirings 73aB and 73bB are formed to face the other surface 71a2 of the inner circumferential surface 71a of the sub cavity for mounting a component 71.

Then, the interlayer connection wirings (via wiring) 75a1 and 75b1 configured to electrically connect each of the second wirings 74a and 74b formed on the second functional layer 43 below the first functional layer 44 and each of the first wirings 73aA and 73bA on one side are formed on the first functional layer 44. Similarly, the interlayer connection wirings (via wiring) 75a2 and 75b2 configured to electrically connect each of the second wirings 74a and 74b and each of the first wirings 73aB and 73bB on the other side are formed on the first functional layer 44.

According to the above-mentioned configuration, the first wiring 73aA and the first wiring 73aB are electrically connected via the second wiring 74a, and function as a series of wirings with the same function. In addition, the first wiring 73bA and the first wiring 73bB are electrically connected via the second wiring 74b, and function as a series of wirings with the same function.

Meanwhile, in a photodetector (electronic part) 460 of the embodiment, a light receiving surface 461 and connection terminals 462a1 and 462b1 on both sides thereof are formed on one vertical surface 460a perpendicular to the one surface 43a of the second functional layer 43. Meanwhile, the connection terminals 462a2 and 462b2 are formed on the other vertical surface 460b of the photodetector (electronic part) 460. Among these, the connection terminal 462a1 and the connection terminal 462a2 are terminals connected to each other with the same electrical function, and a connection terminal 462b1 and a connection terminal 462b2 are terminals connected to each other with the same electrical function.

In addition, in the second wirings 74a and 74b formed on the second functional layer 43, bumps 465a and 465b are formed in a region exposed from the sub cavity for mounting a component 71. The bumps 465a and 465b can be formed by laminating a conductive metal such as gold, silver, solder alloy, or tungsten that constitutes the first wirings 73aA and 73bA, and the second wirings 74a and 74b.

The conductive material 77 is formed to connect the connection terminal 462a1, the first wiring 73aA and the second wiring 74a, and formed to connect the connection terminal 462a2, the first wiring 73aB and the second wiring 74a. Similarly, the conductive material 77 is formed to connect the connection terminal 462b1, the first wiring 73bA and the second wiring 74b, and formed to connect the connection terminal 462b2, the first wiring 73bB and the second wiring 74b.

That is, the photodetector (electronic part) 460 electrically connect the connection terminals 462a1 and 462a2 with the same electrical function to the first wiring 73aA and the second wiring 74a and to the first wiring 73aB and the second wiring 74a via the conductive material 77. In addition, the connection terminals 462b1 and 462b2 with the same electrical function are connected to the first wiring 73bA and the second wiring 74b and to the first wiring 73bB and the second wiring 74b via the conductive materials 77.

In addition, each of the conductive materials 77 is also connected to the conductive bumps 465a and 465b formed on the second wirings 74a and 74b.

In this way, in the embodiment, a connection error of the photodetector (electronic part) 460 can be more reliably prevented more than in each of the above-mentioned embodiments by forming the plurality of connection terminals with the same electrical function on the photodetector (electronic part) 460 and further forming each of the connection terminal across the first wiring and the second wiring.

In addition, in the light source unit (optical device) 410 of the embodiment, a blind hole 481 recessed in the thickness direction of the second functional layer 43 is formed in a region exposed from the sub cavity for mounting a component 71 in the second functional layer 43 and a portion sandwiched between the second wiring 74a and the second wiring 74b. Then, a part-fixing-resin layer 482 in contact with the bottom portion of the photodetector (electronic part) 460 is formed to fill the inside of the blind hole 481.

According to the above-mentioned configuration, when the photodetector 460 is mounted, after the photodetector 460 is fixed to the second functional layer 43 by the part-fixing-resin layer 482, since each of the connection terminals of the photodetector 460 is electrically connected to the first wiring and the second wiring by each of the conductive materials 77, workability upon mounting of the photodetector 460 is improved, and a mounting work becomes easier.

(Method of Mounting an Electronic Part)

Next, a method of mounting an electronic part when the light source unit (optical device) 10 of the first embodiment (FIGS. 1 to 5) is formed will be described.

When the electronic part, for example, the photodetector 60 is mounted on the laminated substrate 40 before the electronic part are mounted, first, the photodetector 60 is positioned and placed at a predetermined position of the one surface 43a of the second functional layer 43 exposed from the sub cavity for mounting a component 71 formed in the first functional layer 44 (a mounting process).

Here, the bottom surface of the photodetector 60 and the one surface 43a of the second functional layer 43 exposed between the second wiring 74a and the second wiring 74b are preferably fixed using a resin such as an adhesive agent or the like. As the adhesive agent, for example, it may be referred to as a die bonding material such as an epoxy system or the like. Specifically, after the die bonding material (adhesive agent) is dispensed and after the photodetector 60 is placed and temporarily fixed, the following conductive resin is filled and thermally cured.

Next, for example, the gap between the connection terminal 62a of the photodetector 60 and the inner circumferential surface 71a of the sub cavity for mounting a component 71 is filled with the conductive resin such as silver paste or the like, and the conductive material 77 that electrically connects the connection terminal 62a, the first wiring 73a and the second wiring 74a is formed (a connecting process).

Similarly, the gap between the connection terminal 62b of the photodetector 60 and the inner circumferential surface 71a of the sub cavity for mounting a component 71 is filled with the conductive resin, and the conductive material 77 that electrically connects the connection terminal 62b, the first wiring 73b and the second wiring 74b is formed (a connecting process).

In this way, conduction through the connection terminal 62a can be reliably performed by electrically connecting the one connection terminal 62a to both of the first wiring 73a and the second wiring 74a that are wirings with the same function via the conductive material 77 in which the conductive resin is filled and cured. Similarly, conduction through the connection terminal 62b can be reliably performed by electrically connecting the one connection terminal 62b to both of the first wiring 73b and the second wiring 74b that are wirings with the same function via the conductive material 77 in which the conductive resin is filled and cured.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical device comprising a laminated substrate in which a plurality of functional layers are laminated, and an optical part and an electronic part disposed on the laminated substrate,
   wherein one of the functional layers is a first functional layer that the optical part is placed one, and one of other of the functional layers is a second functional layer that is disposed below the first functional layer and the electronic part is placed on,
   a first wiring is provided on one surface of the first functional layer and a second wiring is provided on one surface of the second functional layer,
   a connection terminal of the electronic part is electrically connected to both of the first wiring and the second wiring via a conductive material,
   a sub cavity for mounting a component penetrating through the first functional layer is formed in the first functional layer, and the electronic part is placed in the sub cavity for mounting a component, and
   an notch cutout in a direction in which the sub cavity for mounting a component extends is formed at a position adjacent to an end portion of the wiring of the first functional layer.

2. An optical device comprising a laminated substrate in which a plurality of functional layers are laminated, and an optical part and an electronic part disposed on the laminated substrate,
   wherein one of the functional layers is a first functional layer that the optical part is placed one, and one of other of the functional layers is a second functional layer that is disposed below the first functional layer and the electronic part is placed on,
   a first wiring is provided on one surface of the first functional layer and a second wiring is provided on one surface of the second functional layer,
   a connection terminal of the electronic part is electrically connected to both of the first wiring and the second wiring via a conductive material,
   a sub cavity for mounting a component penetrating through the first functional layer is formed in the first functional layer, and the electronic part is placed in the sub cavity for mounting a component,
   in a region exposed from the sub cavity for mounting a component in the second functional layer, a blind hole that is recessed in a thickness direction is formed, and
   a part-fixing-resin layer that is filled in the blind hole and comes into contact with at least a bottom portion of the electronic part is formed.

* * * * *